United States Patent
Larsen et al.

(10) Patent No.: US 8,427,439 B2
(45) Date of Patent: Apr. 23, 2013

(54) AVOIDING OPTICAL EFFECTS OF TOUCH ON LIQUID CRYSTAL DISPLAY

(75) Inventors: Glen C. Larsen, Issaquah, WA (US); Timothy Andrew Large, Bellevue, WA (US); Neil Emerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 12/422,740

(22) Filed: Apr. 13, 2009

(65) Prior Publication Data

US 2010/0259488 A1    Oct. 14, 2010

(51) Int. Cl.
*G09G 3/30* (2006.01)
(52) U.S. Cl.
USPC ................................ 345/173; 345/87; 349/58
(58) Field of Classification Search .......................... None
See application file for complete search history.

(56) References Cited

U.S. PATENT DOCUMENTS

| | | | | |
|---|---|---|---|---|
| 5,515,083 A * | 5/1996 | Casebolt et al. | ............. | 345/175 |
| 5,818,361 A | 10/1998 | Acevedo | | |
| 6,483,498 B1 * | 11/2002 | Colgan et al. | ................. | 345/173 |
| 7,791,683 B2 * | 9/2010 | Larson et al. | ................... | 349/62 |
| 8,031,275 B2 * | 10/2011 | Lee | ................. | 349/12 |
| 2005/0190159 A1 * | 9/2005 | Skarine | ........................ | 345/168 |

* cited by examiner

*Primary Examiner* — Joseph Haley
(74) *Attorney, Agent, or Firm* — Alleman Hall McCoy Russell & Tuttle LLP

(57) ABSTRACT

Embodiments are disclosed herein related to the avoidance of undesirable optical effects in a liquid crystal display used with a touch-sensitive display input device. For example, one embodiment provides a user interface comprising a body, a light source disposed within the body, and a liquid crystal display configured to create an image displayable on one or more display surfaces coupled to the body. The user interface device further includes a light delivery system positioned optically between the light source and the liquid crystal display to deliver light produced by the light source to the liquid crystal display. The light delivery system comprises a light exit surface spaced from the liquid crystal display to form a gap positioned between the light exit surface of the light delivery system and the liquid crystal display.

17 Claims, 4 Drawing Sheets

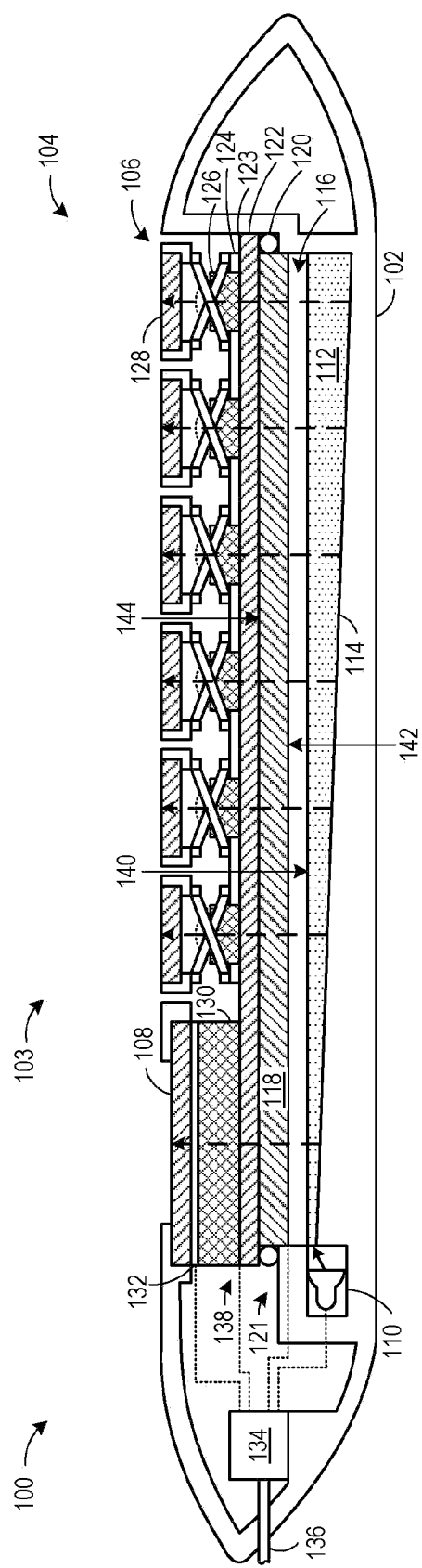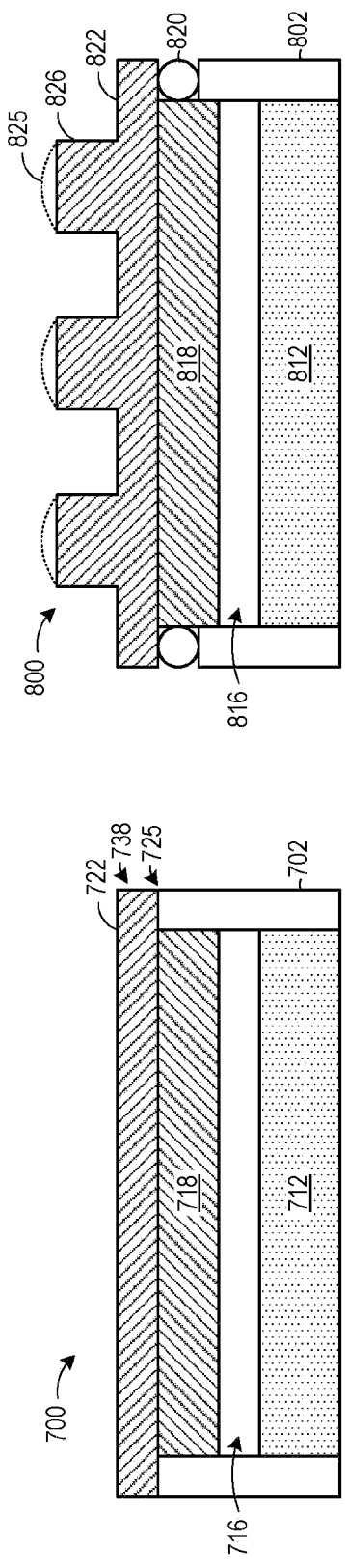

AVOIDING OPTICAL EFFECTS OF TOUCH ON LIQUID CRYSTAL DISPLAY

BACKGROUND

A liquid crystal display panel may be used to display images for a touch-sensitive display input device. However, with such an input device, the appearance of images may suffer from undesirable optical effects if a user touches the display surface with sufficient pressure to cause a change in the alignment of the liquid crystals in the liquid crystal display panel. For example, when a display screen of a computer monitor that includes a liquid crystal display is touched by a user, concentric color banding may appear around the point of touch, which may interfere with the appearance of images proximate to the point of touch.

SUMMARY

Accordingly, various embodiments are disclosed herein related to the avoidance of undesirable optical effects in a liquid crystal display used with a touch-sensitive display input device. For example, one embodiment provides a user interface comprising a body, a light source disposed within the body, and a liquid crystal display configured to create an image displayable on one or more display surfaces coupled to the body. The user interface device further includes a light delivery system positioned optically between the light source and the liquid crystal display to deliver light produced by the light source to the liquid crystal display. The light delivery system further includes a light exit surface spaced from the liquid crystal display to form a gap positioned between the light exit surface of the light delivery system and a light input surface of the liquid crystal display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a sectional view of the user interface device of FIG. 1.

FIG. 7 is a schematic view of another embodiment of a user interface device.

FIG. 8 is a schematic view of yet another embodiment of a user interface device.

DETAILED DESCRIPTION

The present disclosure relates to inhibiting undesirable optical effects that interfere with images displayed on a liquid crystal display in a touch-sensitive user interface device. More particularly, the present disclosure relates to inhibiting changes in alignment of liquid crystal molecules of a liquid crystal display due to compression of the liquid crystal display as a result of pressure applied to the user interface device during a touch input.

Figure 1:
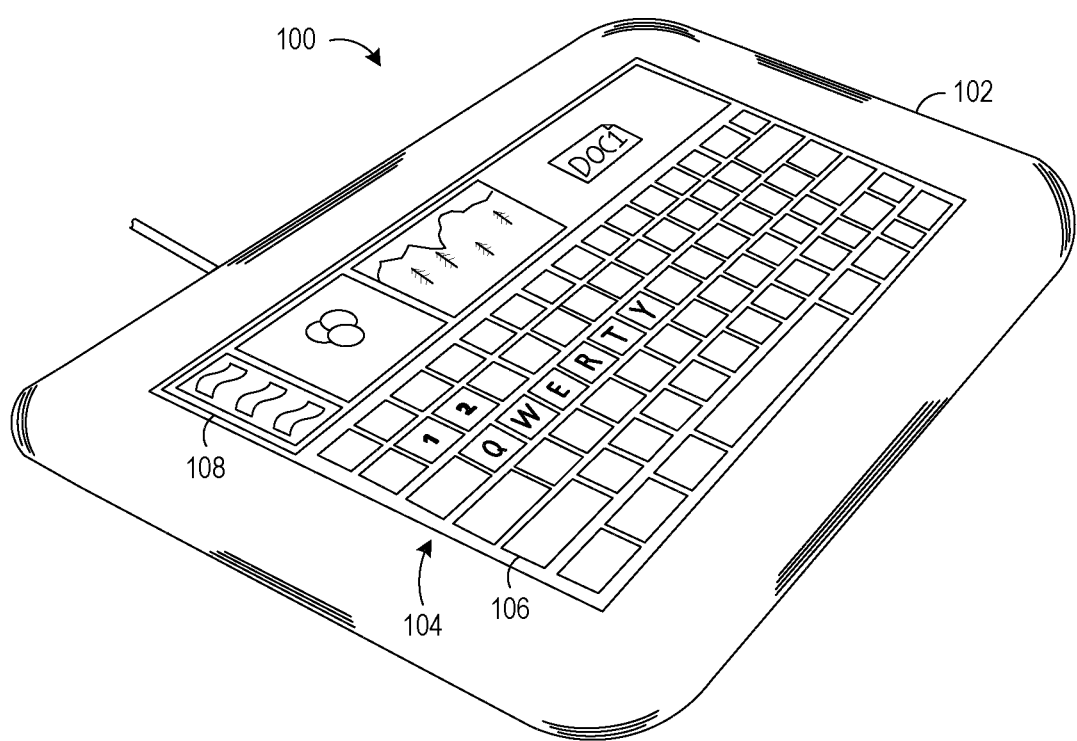
FIG. 1 is a perspective view of an embodiment of a user interface device.

FIG. 1 is a perspective view of an embodiment of a user interface device 100 in the form of an interactive keyboard. The user interface device 100 comprises a body 102 with an opening configured to hold a keypad 104 comprising a plurality of actuatable keys 106. Further, the user interface comprises a touch input display section 108 that may be disposed in body 102 such that the surfaces are coupled to body 102. A user may make inputs via user interface device 100 via the plurality of actuatable keys 106 of keypad 104 and/or touch input display section 108.

Additionally, in some embodiments, each key 106 of the keypad 104 also may be configured to detect touch inputs, as well as mechanical depressions of the keys 106. The user interface device 100 may be configured to translate the touch inputs made via section 108 and/or keys 106 into control commands that may be sent to a computing device in communication with user interface device 100 to control operation of the computing device. In some embodiments, signals generated by the touch input may be sent by user interface device 100 to a computing device, and the computing device may generate control command based on the signals.

The user interface device 100 may be configured to selectively display images on each key of the plurality of actuatable keys 106 and/or on touch input display section 108. In some cases, the display images may provide the user with information about control commands generated by touch input. For example, symbols letters, and/or numbers may be projected onto the plurality of actuatable keys 106 and/or touch input display section 108. As another example, computer application-specific control commands may be displayed on the plurality of actuatable keys 106 and/or touch input display section 108.

FIG. 2 is a sectional view of user interface device 100. The user interface device 100 may be a dynamic rear-projected user interface device in which images may be dynamically generated within the body 102 of user interface device 100 and selectively projected onto the plurality of actuatable keys 106 and/or touch input display section 108.

A light source 110 may be disposed within body 102 of user interface device 100. The light source 110 may include a lamp, a light emitting diode, a multi-color laser projector, etc. In some embodiments, light source 110 may produce light that is collimated. In other embodiments, the light delivery system 112 may deliver collimated light. A light delivery system 112 may be positioned optically between light source 110 and a liquid crystal display 118 to deliver light produced by light source 110 to liquid crystal display 118. In some embodiments, light delivery system 112 may include an optical waveguide in the form of an optical wedge with an exit surface 140. A reflective surface 114 may direct light provided by light source 110 that may be internally reflected within the optical waveguide through light exit surface 140 of the optical waveguide to a light input surface 142 of liquid crystal display 118.

The light exit surface 140 may be spaced from liquid crystal display 118 to form a gap 116 positioned between light exit surface 140 of the optical waveguide and light input surface 142 of liquid crystal display 118. The gap 116 may allow for liquid crystal display 118 to flex under pressure applied to liquid crystal display 118 by touch input (or another force) without being compressed against light delivery system 112. Accordingly, images may be displayed by the liquid crystal display without interference from undesirable optical effects under normal pressure loads encountered during use. The gap 116 is discussed in more detail below.

The liquid crystal display 118 is configured to receive and dynamically modulate light produced by light source 110 to create a plurality of display images that are respectively projected onto the plurality of actuatable keys 106 and/or touch input display section 108. Each of the plurality of actuatable keys 106 may include a diffusion layer 128 on which the display images may be projected. Also, touch input display section 108 may include a diffusion layer on which the display images may be projected. Note light traces produced by light source 110 that are delivered to liquid crystal display 118 via light delivery system 112, and dynamically modulated to form images that may be displayed on surfaces coupled to user interface device 100 are represented by dashed lines.

The body 102 of user interface device 100 may form an opening 103 with a supporting surface such as seal-supporting surface 121. A seal 120 may be disposed on seal-supporting surface 121. A support sheet 122 may be joined to a light exit surface 144 of liquid crystal display 118, for example, via a suitable adhesive, via a mechanical mechanism, or in any other suitable manner. Support sheet 122 may be made of a rigid material, such as a glass or plastic material. Support sheet 122 may have any suitable thickness. In some embodiments, the support sheet 122 may have a thickness that is in a range of 0.5 to 1.5 millimeters. In other embodiments, the support sheet 122 may have any other suitable thickness.

Likewise, the support sheet 122 may have any suitable optical properties. For example, in some embodiments, support sheet 122 may be transparent to visible and infrared light wavelengths. Transparency in infrared wavelengths may allow an infrared vision-based touch detection system to be used to detect touches, rather than capacitive, mechanical, or the like. In some embodiments, support sheet 122 may include an optical coating configured to modify light modulated by liquid crystal display 118. Further, in some embodiments, support sheet 122 may include an optical coating 123. Examples of suitable coatings for optical coating 123 comprise a hot mirror, an anti-reflective coating, etc.

The support sheet 122 comprises a perimeter region 138 that extends beyond an outer edge of liquid crystal display 118 and that contacts an optional seal 120. In this manner, the liquid crystal display 118 is supported above the light delivery system 112 and/or seal 120 to form gap 116. Therefore, under ordinary use conditions, load applied to support sheet 122 via a touch input, mechanical depression of keys 106, etc. is transferred to body 102 and/or seal 120, instead of to liquid crystal display 118. Accordingly, the compression of liquid crystal display 118 due to pressure produced by touch input (or another force) may be reduced, thereby helping to reduce the optical effects of touch inputs.

Furthermore, seal 120 may offer the additional advantage of obstructing substances from entering a region of the body where light may be produced, delivered, and/or modulated. By obstructing substances from entering such a region, the possibility of contaminants (e.g., drink spills, dust particles) from entering the body 102 may be reduced. Seal 120 may include any suitable material that may aid in load transfer and contamination prevention. Examples include, but are not limited to, various polymer materials such as elastomers, etc.

Note that the seal may be optional and in some embodiments, the support sheet and/or the liquid crystal display may interface or be in contact directly with a support surface of the body such that a gap is formed between the liquid crystal display and the light delivery system. In some embodiments, the support sheet may be sized similarly to the liquid crystal display such that a perimeter region may be flush with a perimeter region of the liquid crystal display.

A plurality of optical elements that comprise light divergence inhibitors 126 may be positioned adjacent support sheet 122. Each of the plurality of light divergence inhibitors 126 may be optically positioned between support sheet 122 and a corresponding key of the plurality of actuatable keys 106. Additionally, a light divergence inhibitor 130 may be optically positioned between support sheet 122 and touch input display section 108. The plurality of light divergence inhibitors 126 may be provided to limit divergence of light from light exit surface 144 of liquid crystal display 118 prior to being displayed on the plurality of actuatable keys 106. Likewise, the light divergence inhibitor 130 may be provided to limit divergence of light from light exit surface 144 of liquid crystal display 118 prior to being displayed on touch input display section 108. In some embodiments, the plurality of light divergence inhibitors 126 corresponding to the plurality of actuatable keys 106 may be sized such that when a key is actuated (i.e., in a fully depressed position) it contacts (or nearly contacts) a corresponding light divergence inhibitor in order to minimize a light divergence distance between the light divergence inhibitor and the key. The plurality of light divergence inhibitors 126 and light divergence inhibitor 130 may include a high index material (or a higher optical index than air) that inhibits light divergence and reduces blurriness of a displayed image. This decreases the total effective height of the system. In some embodiments, the high index material may be the same as or similar to material included in support sheet 122.

In some embodiments, the plurality of light divergence inhibitors 126 may be joined to support sheet 122, for example, with a suitable adhesive. In other embodiments, support sheet 122 may be molded to form the plurality of light divergence inhibitors 126 such that the plurality of light divergence inhibitors 126 is integral to support sheet 122. In some embodiments, the support sheet may be integrated with one or more optical elements configured to modify light from the liquid crystal display.

In some embodiments, the plurality of light divergence inhibitors 126 may be replaced by optical elements that comprise one or more lenses configured to modify light modulated by liquid crystal display 118. In particular, the lenses may reduce the illuminated area of the liquid crystal display onto the surface of each of the keys. This makes the viewed image brighter as the angular divergence above the the key surface is dominated by the angular spread at the key surface. In some embodiments, the one or more lenses may be graded index lenses (e.g., a SELFOC lenses). Note the lenses are represented in FIG. 2 by dotted-line arcs.

The touch input display section 108 may be configured to interface with opening 103 formed by body 102 such that touch input display section 108 may be accessible to receive touch input from a user. The touch input display section 108 may be configured to display images produced by liquid crystal display 118. The one or more display images may provide information to the user relating to control commands generated by touch input to touch input display section 108.

A touch input sensor 132, disposed in body 102, may be configured to detect touch input to touch input display section 108. The touch input sensor 132 may detect touch, for example, via capacitive or resistive methods. The touch input sensor 132 may send touch input signals generated by touch input to touch input display section 108 to controller 134. The controller 134 may be configured to generate control commands based on the touch input signals received from touch input sensor 132. The control commands may be sent to a computing device to control operation of the computing device via a communication link 136. The communication link 136 may be configured to provide wired and/or wireless communication with a computing device. Further, controller 134 may be configured to receive instructions from a computing device that may be executed to control operation of user interface device 100 via communication link 136. For example, controller 134 may be configured to receive instructions from a computing device that map control commands to selected keys of the plurality of actuatable keys 106 and/or touch input display section 108. It will be understood that, in other embodiments, other suitable touch-sensing mechanism may be used, including but not limited to vision-based mechanisms in which a camera receives an image of touch input display section 108 via light delivery system (optical waveguide) 112.

The controller 134 may include a microprocessor having instructions stored therein that control operation of user interface device 100. For example, the controller 134 may be configured to control operation of light source 110 (e.g., turn on/off, adjust light intensity, etc.), to control operation of liquid crystal display 118 (e.g., modulate light according to a particular instruction), and/or to receive key signals from membrane sheets 124 that may be configured to detect actuation of one or more of the plurality of actuatable keys 106. The key signals may be generated responsive to contact made between membrane sheets 124 and one or more of the plurality of actuatable keys 106 when one or more of the plurality of actuatable keys 106 is actuated via touch input. The controller 134 may be configured to generated control commands based on the key signals that control operation of a computing device in communication with user interface device 100. Control lines that link controller 134 with components of user interface device 100 are represented by dotted lines.

In other embodiments, controller 134 may send touch input signals received from touch input sensor 132 and/or key signals received from membrane sheets 124 to a computing device, and the computing device may generate control commands to control operation of the computing device based on the touch input signals and/or the key signals.

Figure 3:
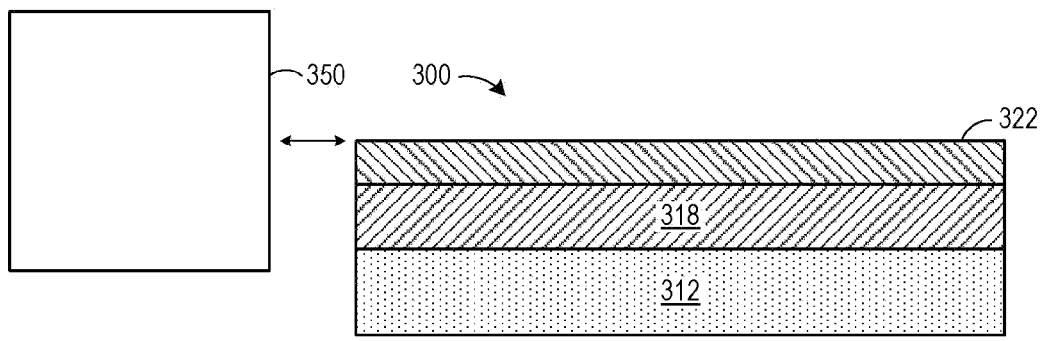
FIG. 3 is a schematic view of a user interface device without an image deformation-inhibiting gap between a liquid crystal display and light delivery system.
Figure 4:
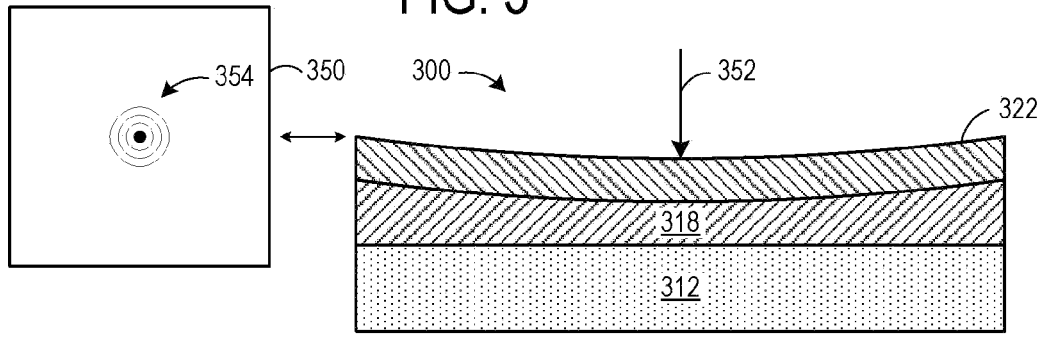
FIG. 4 is a schematic view of the user interface device of FIG. 3 when pressure is applied to the user interface device.

FIGS. 3-4 schematically illustrate an embodiment of a user interface device 300 without a gap between a liquid crystal display 318 and a light delivery system 312, that may suffer from undesirable optical effects that interfere with the appearance of display images due to compression of a liquid crystal display 318 during a touch input on a support sheet 322 overlaying the liquid crystal display.

As shown in FIG. 3, when no pressure is applied to support sheet 322, display surface 350 does not display any optical effects arising from the compression of liquid crystal display 318. In contrast, as shown in FIG. 4, when pressure is applied to support sheet 322 (as shown by line 352, pointing to a "pressure point"), liquid crystal display 318 may be compressed between support sheet 322 and light delivery system 312, thereby producing concentric banding optical effects 354 on display surface 350. The concentric banding optical effects 354 may interfere with display images projected on display surface 350 at pressure point 352, thereby impacting a user experience. In some cases, the display images may appear deformed or may be obstructed from view due to such optical effects.

Figure 5:
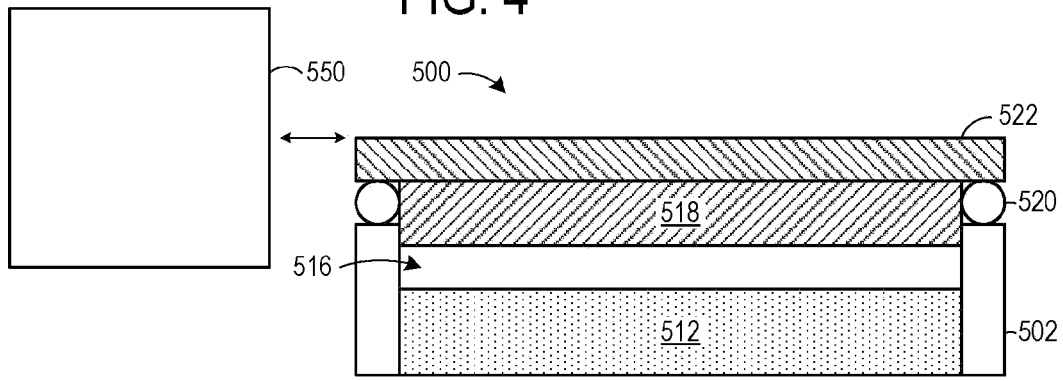
FIG. 5 is a schematic view of a user interface device with an image deformation-inhibiting gap between a liquid crystal display and light delivery system.
Figure 6:
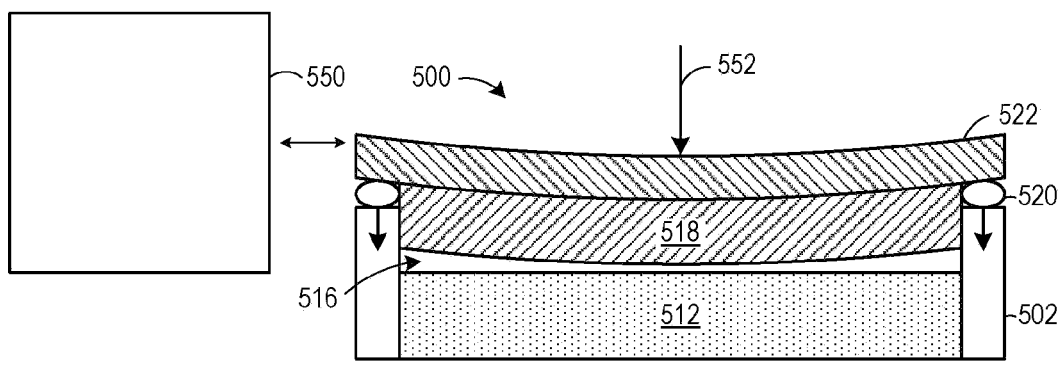
FIG. 6 is a schematic view of a response of the embodiment of FIG. 5 when pressure is applied to the user interface device.

In contrast, FIGS. 5-6 schematically illustrate an embodiment of a user interface device 500 that may display images without interference from undesired optical effects even when pressure is applied to a surface of user interface device 500. Referring to FIG. 5, user interface device 500 includes a light delivery system 512 positioned below a liquid crystal display 518. A support sheet 522 is positioned above liquid crystal display 518. The support sheet 522 comprises a perimeter region that extends beyond an outer edge of liquid crystal display 518 and contacts a seal 520. The seal 520 may be disposed on a seal support surface of a body 502 of user interface device 500 such that seal 520 is supported by body 502. The liquid crystal display 518 may be joined to support sheet 522 such that liquid crystal display 518 is suspended above light delivery system 512, forming a gap 516.

As shown in FIG. 6, when pressure is applied to support sheet 522 (indicated by line 552), the pressure is transferred to body 502 and/or seal 520, as illustrated by the compression of seal 520 in FIG. 6. In this manner, compression of the liquid crystal display 518 may be avoided, as shown at 550 in FIGS. 5-6. This may help to avoid optical effects from the compression. Over time, the reduction in load applied to liquid crystal display 518 as a result of pressure points may reduce the likelihood of premature degradation of liquid crystal display 518.

FIG. 7 schematically illustrates an embodiment of a user interface device 700 where a seal is omitted such that a support sheet 722 interfaces directly with a support sheet-supporting surface 725 of a body 702 of user interface device 700. The user interface device 700 comprises a light delivery system 712 positioned adjacent to a liquid crystal display 718 joined to the support sheet. The support sheet 722 comprises a perimeter region 738 that extends beyond an outer edge of liquid crystal display 718 and contacts support sheet-supporting surface 725. In this manner, liquid crystal display 718 is suspended above light delivery system 712, forming a gap 716 between the liquid crystal display and output surface of the light deliver system. When pressure is applied to support sheet 722 at least some of the load may be transferred to body 702 via support sheet-supporting surface to inhibit compression of liquid crystal display 718 and avoid undesirable optical effects.

FIG. 8 schematically illustrates an embodiment of a user interface device 800 that comprises a support sheet 822 molded to include a plurality of light divergence inhibitors that are integral to support sheet 822. Alternatively, support sheet 822 may be molded to form lenses 825 that may be configured to configured to concentrate light from liquid crystal display 818 onto keys of a keyboard positioned over the lenses 825. In some embodiments, each of the one or more lenses 825 may comprise graded index lenses, while in other embodiments, the lenses may comprise any other suitable optical structure.

Figure 9:
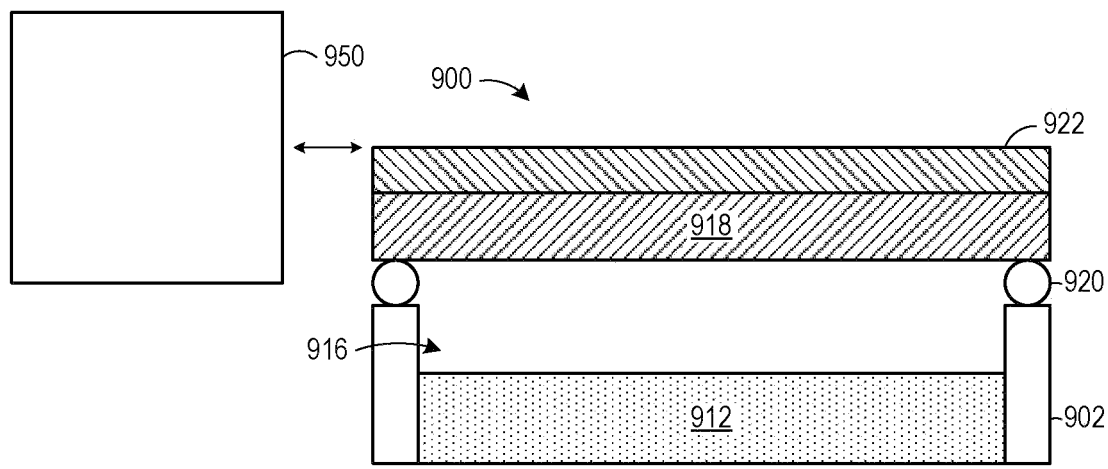
FIG. 9 is a schematic view of yet another embodiment of a user interface device.
Figure 10:
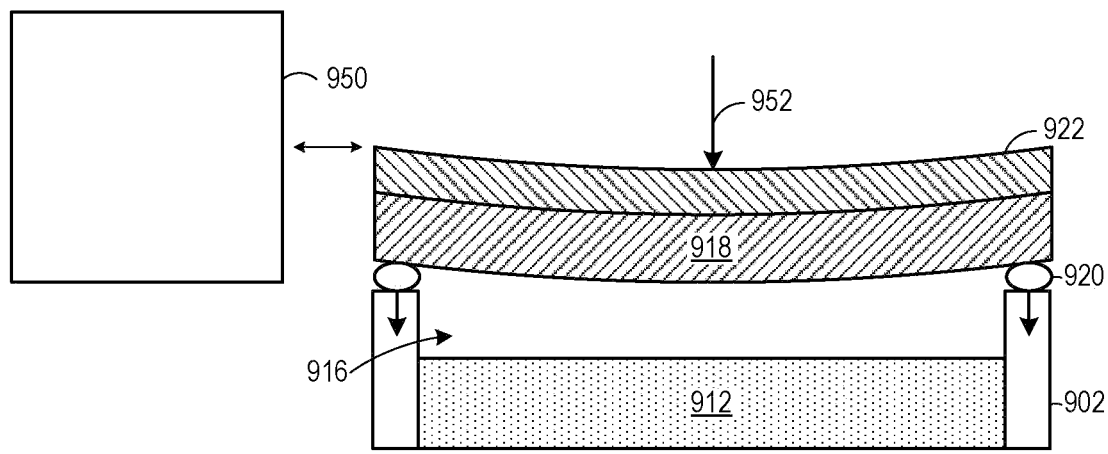
FIG. 10 is a schematic view of the embodiment of FIG. 9 when pressure is applied to the user interface device.

FIGS. 9-10 schematically illustrate another embodiment of a user interface device 900 that may display images with little or no interference from undesired optical effects even when pressure is applied to a surface of user interface device 900. Referring to FIG. 9, user interface device 900 includes a light delivery system 912 positioned below a liquid crystal display 918. A support sheet 922 is positioned above liquid crystal display 918. The support sheet 922 and liquid crystal display 918 may have the same or similar area. The liquid crystal display 918 contacts a seal 920. The seal 920 may be disposed on a seal support surface of a body 902 of user interface device 900 such that seal 920 is supported by body 902. The liquid crystal display 918 may be joined to support sheet 922. The liquid crystal display 918 is positioned above light delivery system 912, forming a gap 916.

As shown in FIG. 10, when pressure is applied to support sheet 922 (indicated by line 952), the pressure is transferred to body 902 and/or seal 920, as illustrated by the compression of seal 920 in FIG. 10. In this embodiment, optical banding may still occur at the edges of the display, under the perimeter, but this may be outside the general viewable area of the display. In this manner, compression of the liquid crystal display 918 may be avoided in a viewable area of the display, as shown at 950 in FIGS. 9-10. Note this same architecture may be applied to the configuration shown in FIG. 7. That is, in some embodiments, a liquid crystal display secured to a support sheet of the same size (or area) may interface directly with a support surface of a body of the user interface device to form a gap the allows the liquid crystal display to flex under pressure to prevent undesirable optical effects.

It should be understood that the embodiments herein are illustrative and not restrictive, since the scope of the invention is defined by the appended claims rather than by the description preceding them, and all changes that fall within metes and bounds of the claims, as well as the equivalence of such metes and bounds thereof are therefore intended to be embraced by the claims.

The invention claimed is:

1. A user interface device, comprising:
   a body comprising a support surface;
   a light source disposed within the body;
   a liquid crystal display configured to receive and dynamically modulate light produced by the light source to create an image displayable on one or more display surfaces coupled with the body;
   a support sheet joined to a light exit surface of the liquid crystal display, the support sheet comprising a perimeter region that extends beyond an outer edge of the liquid crystal display and over the support surface of the body; and
   a light delivery system positioned optically between the light source and the liquid crystal display to deliver light produced by the light source to the liquid crystal display, the light delivery system comprising a light exit surface spaced from the liquid crystal display to form a gap positioned between the light exit surface of the light delivery system and a light input surface of the liquid crystal display, wherein the liquid crystal display is positioned between the support sheet and the light delivery system.

2. The user interface device of claim 1, wherein the perimeter region of the support sheet contacts the support surface of the body.

3. The user interface device of claim 1, further comprising:
   a seal disposed on the support surface, wherein the seal contacts the support sheet.

4. The user interface device of claim 1, wherein the liquid crystal display contacts the body.

5. The user interface device of claim 1, further comprising:
   a seal disposed on the support surface, wherein the seal contacts the liquid crystal display.

6. The user interface device of claim 1, wherein the support sheet has a thickness in a range of 0.5 to 1.5 millimeters.

7. The user interface device of claim 1, wherein the support sheet comprises an optical coating that comprises one or more of a hot minor and an antireflective coating.

8. The user interface of claim 1, wherein the support sheet is integrated with one or more optical elements configured to modify light from the liquid crystal display.

9. The user interface device of claim 8, wherein the one or more optical elements comprise graded index lenses.

10. The user interface device of claim 8, wherein the one or more optical elements comprise light divergence inhibitors.

11. A user interface device, comprising:
    a body;
    a keypad comprising a plurality of actuatable keys;
    a light source;
    a liquid crystal display configured to receive and dynamically modulate light produced by the light source to create a plurality of display images that are respectively projected onto the plurality of actuatable keys; and
    an optical waveguide positioned optically between the light source and the liquid crystal display to deliver light produced by the light source to the liquid crystal display, the optical waveguide comprising a light exit surface spaced from the liquid crystal display to form a gap positioned between the light exit surface of the optical waveguide and a light input surface of the liquid crystal display; and
    a support sheet joined to a light exit surface of the liquid crystal display, the support sheet comprising one or more graded index lenses and a perimeter region that interfaces with the body to space the liquid crystal display from the optical waveguide.

12. The user interface device of claim 11, wherein the body comprises a seal-supporting surface, and wherein the user interface device further comprises:
    a seal disposed on the seal-supporting surface, wherein one or more of the support sheet and the liquid crystal display contacts the seal.

13. The user interface device of claim 11, further comprising:
    a plurality of light divergence inhibitors, each of the plurality of light divergence inhibitors being optically positioned between the support sheet and a corresponding key of the plurality of actuatable keys.

14. The user interface device of claim 13, wherein the support sheet is molded such that the plurality of light divergence inhibitors is integral to the support sheet.

15. The user interface device of claim 13, wherein the plurality of light divergence inhibitors is joined to the support sheet with an adhesive.

16. A user interface device, comprising:
    a body comprising an opening with a seal-supporting surface;
    a seal disposed on the seal-supporting surface;
    a keypad disposed within the opening of the body and comprising a plurality of actuatable keys;
    a light source disposed within the body;
    a liquid crystal display configured to receive and dynamically modulate light produced by the light source to create a plurality of display images that are respectively projected onto the plurality of actuatable keys;
    a support sheet joined to a light exit surface of the liquid crystal display, the support sheet comprising an optical coating that comprises one or more of a hot minor and an anti-reflective coating and a perimeter region that extends beyond an outer edge of the liquid crystal display and that contacts the seal; and
    an optical waveguide positioned optically between the light source and the liquid crystal display to deliver light produced by the light source to the liquid crystal display, the optical waveguide comprising a light exit surface spaced from the liquid crystal display to form a gap positioned between the light exit surface of the optical waveguide and a light input surface of the liquid crystal display.

17. The user interface device of claim 16, further comprising:
a plurality of light divergence inhibitors, each of the plurality of light divergence inhibitors being optically positioned between the support sheet and a corresponding key of the plurality of actuatable keys.

* * * * *